(12) United States Patent
de Lacy et al.

(10) Patent No.: US 6,929,407 B2
(45) Date of Patent: Aug. 16, 2005

(54) MODULE APPARATUS AND METHOD OF ALIGNMENT

(75) Inventors: Hugh de Lacy, Ipswich (GB); Goncalo Agra Amorim, Ipswich (GB); Christopher John Ord, Ipswich (GB)

(73) Assignee: Agilent Technologies, Inc., Palo Alto, CA (US)

( * ) Notice: Subject to any disclaimer, the term of this patent is extended or adjusted under 35 U.S.C. 154(b) by 75 days.

(21) Appl. No.: 10/396,236

(22) Filed: Mar. 25, 2003

(65) Prior Publication Data

US 2003/0185525 A1 Oct. 2, 2003

(30) Foreign Application Priority Data

Mar. 27, 2002 (EP) ............................................. 02252208

(51) Int. Cl.⁷ ................................................. G02B 6/36
(52) U.S. Cl. .......................................... 385/92; 385/88
(58) Field of Search ............................. 385/88, 92, 53, 385/56; 439/79

(56) References Cited

U.S. PATENT DOCUMENTS

| 5,151,961 | A | * | 9/1992 | Hvezda et al. ................. 385/60 |
| 5,325,454 | A | * | 6/1994 | Rittle et al. .................... 385/76 |
| 5,329,604 | A | * | 7/1994 | Baldwin et al. ............... 385/92 |
| 5,666,449 | A | | 9/1997 | Sawae et al. ................... 385/49 |
| 6,299,362 | B1 | * | 10/2001 | Gilliland et al. .............. 385/92 |
| 6,604,862 | B2 | * | 8/2003 | Rogge et al. .................. 385/56 |
| 6,692,159 | B2 | * | 2/2004 | Chiu et al. ..................... 385/53 |

FOREIGN PATENT DOCUMENTS

| EP | 0 913 667 | 5/1999 |
| EP | 0 973 051 | 1/2000 |
| WO | WO 00/77551 | 12/2000 |

* cited by examiner

*Primary Examiner*—John R. Lee
*Assistant Examiner*—Paul M. Gurzo

(57) ABSTRACT

The assembly of a packaged opto-electronic module of a type that comprises an optical subassembly coupled to an LC housing integrally formed within the housing of the module typically results in the optical subassembly being disposed in a location having a gap between a heat sink region of the module and the optical subassembly.

21 Claims, 4 Drawing Sheets

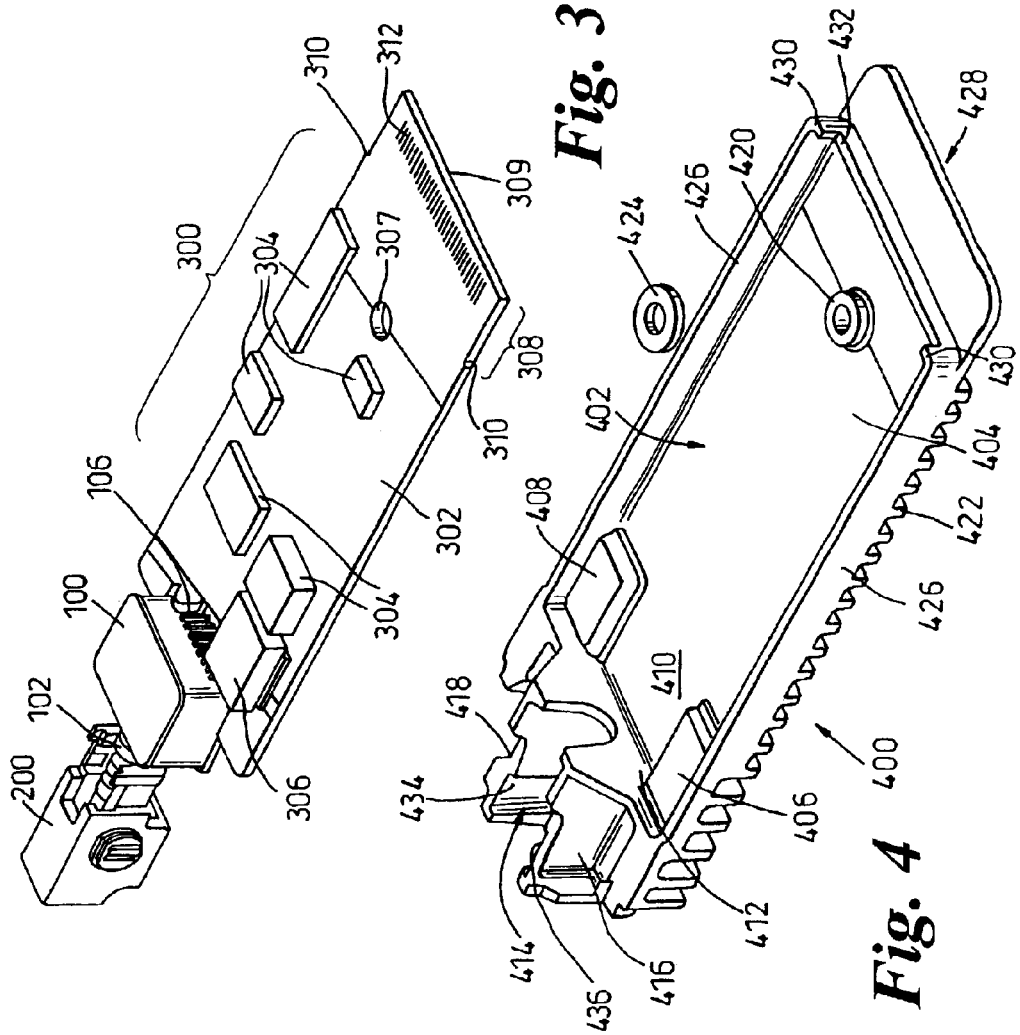

MODULE APPARATUS AND METHOD OF ALIGNMENT

FIELD OF THE INVENTION

The present invention relates to a module apparatus for a fibre-optic communications system, the module being of the type, for example, that can be removably coupled to a Network Equipment Manufacturer's (NEMs) circuit board and replaced when such module fails. The present invention also relates to a method of aligning an optoelectronic package with a connector housing, for example, of the type forming part of the module apparatus.

DISCUSSION OF THE BACKGROUND ART

In an optical communications network, a known packaged optoelectronic module such as a transmitter, receiver or transceiver module typically comprises a housing containing an optical subassembly comprising, for example, an optoelectronic package having an optical connector for coupling to an external optical fibre for propagation of electromagnetic radiation to/from the network. The optoelectronic package has a laser device or a photodetector therein, and an array of flexible leads for communicating electrical signals to and from the interior of the optoelectronic package. The array of flexible conducting leads is typically coupled to a Printed Circuit Board (PCB) comprising known circuitry suitable for controlling the laser device or photodetector and to provide functionality to the module.

In order to provide efficient coupling of electromagnetic radiation between the optical connector and an optoelectronic device located within the optoelectronic package, such as the laser device or the photodetector, an initial alignment process is necessary between the optical connector and active region of the optoelectronic device, for example a light emitting portion of the laser device in the case of the transmitter module or an absorbing portion of the photodetector in the case of the receiver module, or both for a tranceiver module. For an ideal coupling between the optical connector and the optoelectronic package, a central longitudinal axis associated with the optical connector should coincide with a centrally located axis passing through a wall of the optoelectronic package. However, the above initial alignment process typically results in the optical subassembly having an axial misalignment between the longitudinal axis of the optical connector and the central axis of the optoelectronic package. The amount of axial misalignment also varies between individual optical subassemblies according to the degree of positional adjustment of the optical connector necessary to align the optical connector with the optoelectronic device during the initial alignment process. Typically, the optical connector forms part of an industry standard connector, for example, a Lucent® Connector (LC) having a socket opening having a pre-defined configuration for receiving a complementarily shaped plug, the optical connector lying within the socket. The socket opening is integrally formed with the housing, the optical connector being fixed within the socket opening so as to maintain a fixed positional relationship between the socket opening and the optical connector. The inconsistent axial alignment between the individual optical connectors and the optoelectronic packages also results in the positional relationship between the optoelectronic packages and the PCBs varying from module to module. This inconsistent positional relationship between the optoelectronic packages and the PCBs complicates the design of a generic packaged optoelectronic module.

In order to accommodate the variations in the positional relationship between the optoelectronic packages and the PCBs, it is known for the length of the array of flexible leads to vary in order to, where appropriate, bridge an increased wiring path between the optoelectronic packages and the PCBs. However, such an increase in electrical paths can result in an increase in undesirable capacitive effects experienced by electrical signals using the extended array of leads.

Additionally, where the laser diodes are housed within the optoelectronic packages, it is necessary to sink heat generated by the laser diodes. In addition to the relative position between the optoelectronic packages and the PCBs being inconsistent, the positional relationships between bases of the optoelectronic packages and housings containing the optoelectronic packages are also inconsistent, resulting in an inability to thermally couple the bases of the optoelectronic packages with the housings of the optoelectronic modules in order to provide efficient heat removal from the optoelectronic package while in operation; efficient heat removal requires that the source of the heat dissipation, for example the optoelectronic package comprising the semiconductor laser device, to be disposed in intimate contact with the housing or other means of heat removal. Due to the inconsistent positional relationship between the bases of the optoelectronic packages and the housings, a variable gap typically exists between the housings and the optoelectronic packages.

Without an efficient means of heat removal, the ambient temperature inside the packaged optoelectronic module can rise above the rated range of thermal operability recommended for components disposed upon the PCB and the optoelectronic device within the optoelectronic package, which can lead to malfunctions in the circuitry of the PCB and/or an unwanted variability in the laser device output characteristics or photodetector efficiency.

SUMMARY OF THE INVENTION

According to the present invention, there is provided a module apparatus for a fibre-optic communications system, the apparatus comprising a housing assembly having a base part, an optoelectronic package having at least one optoelectronic device therein, the optoelectronic package being disposed within the base part of the housing assembly; the optoelectronic package comprising a first part of a coupling attached thereto, the coupling being arranged to receive a ferrule connector; wherein at least a portion of the first part of the coupling is substantially fixedly located within a connector housing, and wherein the connector housing is arranged to be received within a complimentary shaped channel disposed on the base part of the housing assembly.

The complimentary shaped channel may be integrally formed with the base part of the housing assembly.

The optoelectronic device may be a laser device and the housing further comprises means for maintaining the wavelength of the electromagnetic radiation emitted by the laser device at a desired wavelength. The means for maintaining the wavelength of the electromagnetic radiation at a desired wavelength to suit, for example, DWDM applications may be located within the optoelectronic package. The means for maintaining the wavelength of the electromagnetic radiation at a desired wavelength of the electromagnetic radiation may be a wavelength locker.

The connector housing may be shaped and/or configured so as to define one half of an LC connection. The half of the LC connection may be an LC socket. Alternatively, the connector housing is shaped and/or configured so as to define one half of an MU connection.

The base part of the housing assembly may comprise an aperture to permit protrusion of an end of the electrical circuit board therethrough, the end of the electrical circuit board being distal from the optoelectronic package, the aperture being defined, in part, by a locator side wall for cooperating with the electrical circuit board so as to prevent excessive protrusion of the electrical circuit board beyond the aperture. A locator shoulder may be provided at the end of the electrical circuit board to cooperate with the locator sidewall.

The electrical circuit board may be arranged to cooperate with a pivot arrangement so as to pivot during assembly of the apparatus about a point provided by the pivot arrangement, thereby facilitating alignment of the electrical circuit board with respect to the optoelectronic package during assembly of the apparatus. The electrical circuit board may be arranged to cooperate with the pivot arrangement near the end of the electrical circuit board distal from the optoelectronic package. The electrical circuit board may comprise an aperture formed therein located between a notional lateral centre line and the end of the electrical circuit board.

The housing may comprise a channel for locating the optoelectronic package therein relative to the housing. The channel may be a blind channel. The width of the channel may be such so as to permit the optoelectronic package to be in intimate contact with the housing even when there is an axial misalignment between the longitudinal axis of the optical connector and the central axis of the optoelectronic package.

The housing may define an internal volume and the electrical circuit board lies substantially within the internal volume, and the apparatus further comprises spacer means disposed adjacent the electrical circuit board so as to locate the electrical circuit board within the internal volume.

The housing may define a substantially complementarily shaped channel with respect to the connector housing, the connector housing being located within the complementarily shaped volume. The complementarily shaped channel may comprise locator features to at least hinder incorrect orientation of the connector housing within the complementarily shaped channel volume during assembly of the apparatus. The depth of the complementarily shaped channel may be sufficient that when the assembled optoelectronic package, coupling and connector housing is fitted into the housing the base of the optoelectronic package is in close thermal contact with the housing.

The complementarily shaped channel may be partly defined by a first wall and a second wall, the first wall being shaped so as to provide a first locator feature and the second wall being shaped so as to provide a second locator feature, the first locator feature being offset with respect to the second locator feature. The substantially complementarily shaped channel may be shaped so as to provide a clearance for receiving adhesive between the connector housing and at least a portion of one of the first or second walls.

At least one of the locator features may be configured so as to accommodate adhesive between the connector housing and the at least one of the locator features. The at least one of the locator features may be configured to facilitate keying between the at least one of the locator features and the adhesive.

The connector housing may be arranged to comprise complementary locator features, the complementary locator features cooperating with the locator features. At least one of the complementary locator features may be configured so as to accommodate adhesive between the connector housing and the at least one of the complementary locator features. The at least one of the complementary locator features may be configured to facilitate keying between the at least one of the complementary locator features and the adhesive. The adhesive may be electrically conductive.

It is thus possible to provide a module apparatus that reliably results in the optoelectronic package being disposed in thermal contact with a means for heat removal provided. The alignment of the optoelectronic package with the connector housing and the electrical circuit board obviates, or at least mitigates unpredictable inductive effects, whilst ensuring that when mounting the optoelectronic package within the packaged optoelectronic module, the optoelectronic package is disposed in thermal contact with a means for heat removal provided. A generic packaged optoelectronic module is therefore provided.

BRIEF DESCRIPTION OF THE DRAWINGS

At least one embodiment of the present invention will now be described, by way of example only, with reference to the accompanying drawings, in which:

FIG. 3 is a schematic diagram of the optoelectronic package of FIG. 1 coupled to the LC housing of FIG. 2 and an electrical circuit board;

FIG. 4 is a schematic diagram of a first half of a two-part outer housing;

DETAILED DESCRIPTION OF THE PREFERRED EMBODIMENT

Figure 1:
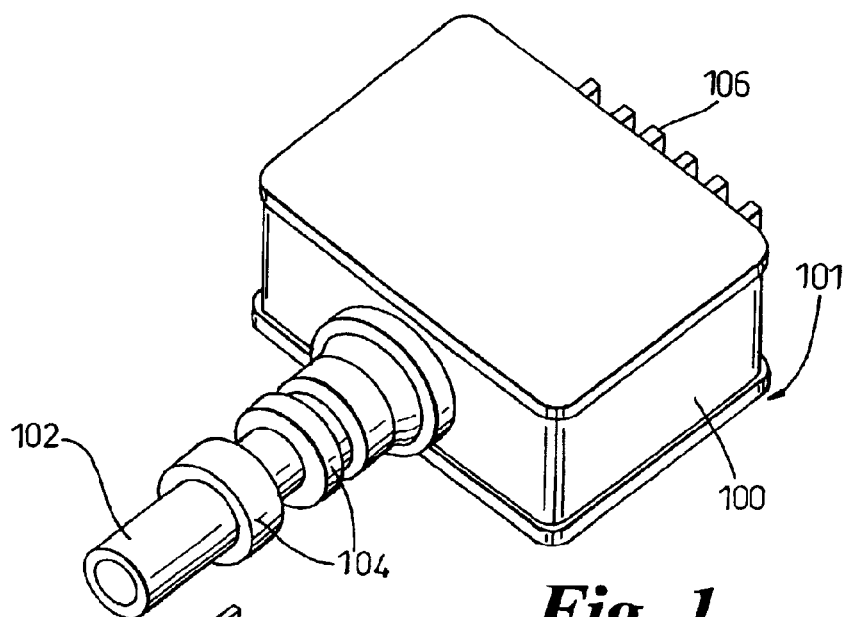
FIG. 1 is a schematic diagram of an optoelectronic package.

Throughout the following description identical reference numerals will be used to identify like parts.

Referring to FIG. 1, an optoelectronic package 100 having a base 101 forms a part of a packaged optoelectronic module (not shown) and comprises an optical connector 102 constituting a first part of a coupling, the optical connector 102 being capable of receiving a ferrule connector. The optical connector 102 comprises a number of ringed alignment features 104 along its length and has a first end coupled to a first side of the optoelectronic package 100, which comprises, on a second side, an array of flexible connecting leads 106. Disposed within the optoelectronic package 100 is an optoelectronic device (not shown) such as a laser device to transmit electromagnetic radiation (not shown) from the optoelectronic package 100 within the optoelectronic module to an optical communications system connected to the optoelectronic module by means of, for example, a fibre-optic patch cord (not shown) connected to the optical communications system and coupled to a second end of the optical connector 102.

The module apparatus and, for example, in particular the optoelectronic package 100 can contain means for maintaining a wavelength of electromagnetic radiation emitted by the laser device, for example, a wavelength locker.

Figure 2:
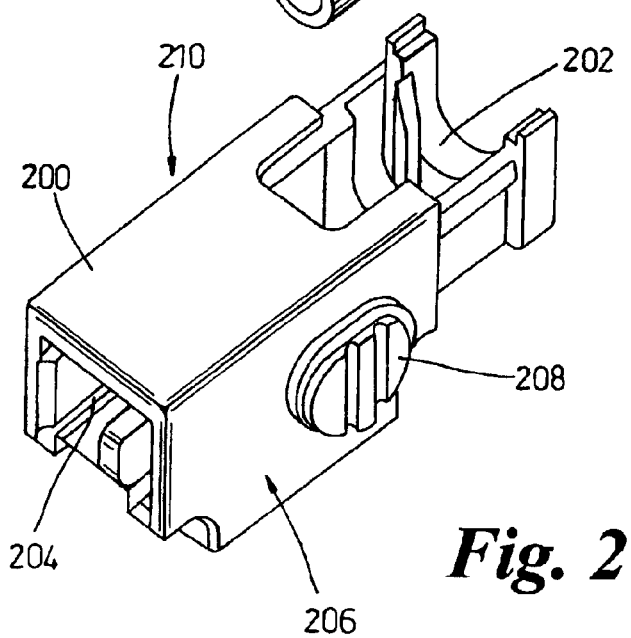
FIG. 2 is a schematic diagram of an LC housing.

Referring to FIG. 2, a connector housing, such as an LC housing 200, comprises a partitioned U-shaped channel 202 to receive the ringed alignment features 104 of the optical connector 102 of FIG. 1. The LC housing 200 further comprises a profiled opening 204 to receive a second part of the coupling, for example an LC plug coupled to a fibre-optic patch cord (not shown) which is ultimately coupleable to the second end of the optical connector 102 of FIG. 1. A first side 206 of the LC housing 200 comprises a first protrusion 208 and a second side 210 of the LC housing 200 comprises a second protrusion (not shown), the first protrusion 208 being offset with respect to the second protrusion. In this example, the first and second protrusions 208 are profiled, for example their surfaces comprise striped grooves to enhance keying of the protrusions with adhesives. The first and second protrusions 208 constitute locator features for ensuring correct orientation of the LC housing 200 during assembly thereof. It should be appreciated that alternatives to the protrusions exist and the LC housing 200 can have other features, for example, recesses to achieve the same effect.

Referring to FIG. 3, the optical connector 102 is coupled to the LC housing 200 by a known laser stake welding technique, and the array of flexible connecting leads 106 are coupled to an electronic assembly 300 by, for example, a known solder process. The electronic assembly 300 comprises a Printed Circuit Board (PCB) 302 populated by components 304 arranged to, for example, drive the optoelectronic device within the optoelectronic package 100 and means for cooling the optoelectronic device, for example a thermoelectric cooler device 306. The PCB 302 comprises a circular aperture 307 located between a notional lateral centre line (not shown) and an end 309 of the PCB 302 distal from an end thereof to be coupled adjacent the optoelectronic package 100.

Referring to FIG. 4, a first part of a two-part housing of the optoelectronic module, in this example constituting a base part 400 of the two-part housing, has a notional longitudinal central axis. The base part 400 comprises an inner side 402 profiled so as to provide a substantially planar surface 404 comprising a first raised portion 406 and a second raised portion 408, the first and second raised portions 406,408 defining a channel 410 which, in this example, is a blind channel closed by a partition wall 412. The blind channel 410 is intended for disposing the optoelectronic package 100 therein. The width of the channel 410 is such as to permit the base 101 of the optoelectronic package 100 to come into intimate contact with the surface of the housing 404 even when the axis of the optical connector 102 is not exactly aligned with the axis of the optoelectronic package 100 in order to provide thermal communication between the optoelectronic package 100 and base part of the housing 400.

At a first, proximal, end of the base part 400, a substantially complementarily shaped channel 414 is defined, in part, by a first sidewall 416 and a second sidewall 418. The complementarily shaped channel 414 becomes a complementarily shaped volume when the two-part housing is closed by a second, top, part (not shown) of the two-part housing. The complementarily shaped channel 414 is shaped so as to specifically receive the LC housing 200. However, the complementarily shaped channel 414 is sized to provide play between the interior of the complementarily shaped channel 414 and the LC housing 200. The complimentary shaped channel 414 may be an integrally formed part of the base part 400, or it may be fixed attached to the base part.

The complementarily shaped channel 414 comprises first and second recessed channels 434, 436 to receive to first and second protrusions 208. The first and second recessed channels 434, 436 are complementary with respect to the first and second protrusions 208. In this example, the first and second recessed channels 434, 436 are substantially perpendicular to the base part 400 to facilitate insertion of the LC housing 200 into the complementarily shaped channel 414. The first and second recessed channels 434, 436 are offset with respect to each other in a corresponding manner to that of the first and second protrusions 208. The depth of the complementarily shaped channel 414 is such as to permit the base 101 of the optoelectronic package 100 to come into intimate contact with the surface of the housing 404 even when the axis of the optical connector 102 is not exactly aligned with the axis of the optoelectronic package 100 in order to provide thermal communication between the optoelectronic package 100 and base part of the housing 400. The first and second recessed channels 434, 436 comprise substantially vertical ribs to facilitate keying with adhesives. Although, in the above example, the first and second recessed channels 434, 436 are employed, it should be appreciated that the complementarily shaped channel 414 can be provided with alternatively shaped features to co-operate with the locator features of the LC housing 200.

The planar surface 404 comprises a raised annular portion 420 forming part of an internally threaded blind bore for receiving a screw (not shown) to secure the top part (not shown) of the two-part housing in order to close the housing. The outside surfaces of the base and top parts comprise fins 422 to assist heat dissipation by the two-part housing. A nylon gasket 424 can be disposed upon the raised annular portion 420 to aid alignment of the PCB 302 and stability to the complete assembly. Sidewalls 426 of the base part 400 of the two-part housing turn inwards towards each other at a distal end 428 of the optoelectronic module to form locator walls 430. The locator walls 430, together with a shallow end wall 432 and the top part of the two-part housing define a slot (not shown) through which an end portion 308 of the PCB 302 protrudes. The PCB 302 comprises locator shoulders 310 which co-operate with the locator walls 430 to prevent excessive protrusion of the PCB 302 beyond the slot, yet sufficiently to expose an edge connector 312 provided at the end portion 308 of the PCB 302.

Figure 5:
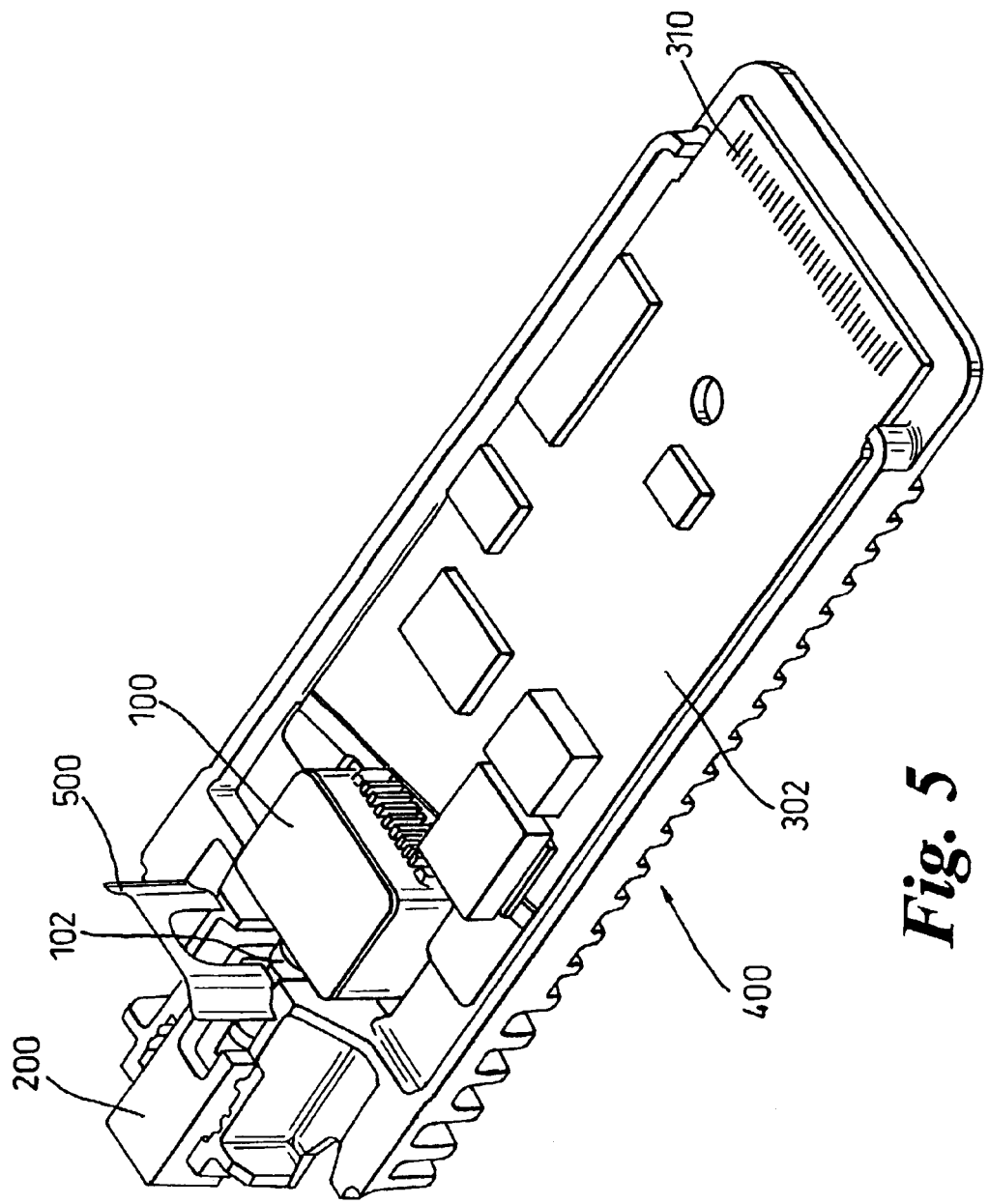
FIG. 5 is a schematic diagram of a part-assembled apparatus comprising the parts of FIGS. 2, 3 and 4.

Referring to FIG. 5, the PCB 302 is soldered to the optoelectronic package 100 and an electromagnetic shielding gasket 500 is disposed between the optoelectronic package 100 and the LC housing 200. The optoelectronic package 100 is aligned with the LC housing 200, and subsequently with the PCB 302 as follows.

Figure 6:
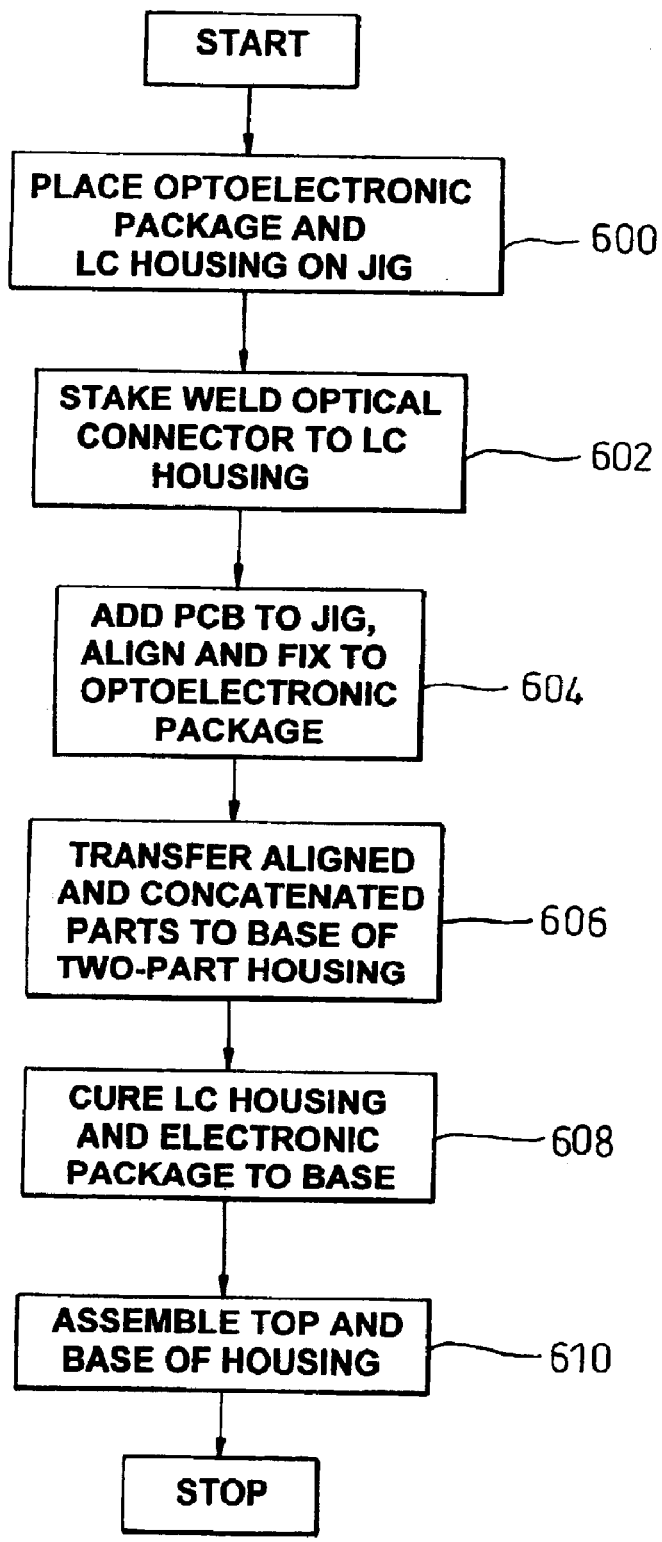
FIG. 6 is a flow diagram of a method of assembly of the module apparatus as shown, in part, in FIG. 5.

Referring to FIG. 6, the LC housing 200 and the optoelectronic package 100 are initially placed (step 600) on a first jig (not shown). The first jig holds and aids alignment of the above mentioned parts prior to insertion of the parts onto a second jig (not shown). Since the first jig is shaped so as to mimic the blind channel 410 and the complementarily shaped channel 414 of the two-part housing, whilst providing access to work on piece parts placed on the first jig, identical reference numerals and part names will be used to refer to corresponding parts of the first jig.

Firstly, the LC connector 200 is placed within the complementarily shaped channel 414 and the optoelectronic package 100 is placed in the blind channel 410 so that the optical connector 102 lies, at least in part, within the LC housing 200 and the ringed alignment feature 104 lie within and cooperates with the partitioned U-shaped channel 202 and an axial alignment and a correct positioning of the optical connector 102 within the LC housing 200 is obtained. The optoelectronic package 100 is displaced, rotated and/or jiggled, in the blind channel 410 and about a longitudinal axis of the optical connector 102 so as to ensure that the base 101 of the optoelectronic package 100 lies against the planar surface 404, i.e. rotational alignment of the optoelectronic package 100 is achieved. Following the correct alignment and positioning of the optical connector 102 within the LC housing 200, the optical connector 102 is fixed in position within the LC housing 200 using, for example, a known stake weld process (step 602).

The LC housing 200 and the optoelectronic package 100, now fixed to the LC housing 200, are transferred to the second jig (not shown). The second jig holds and aids alignment of the LC housing/optoelectronic package combination with the electronic assembly 300 prior to placing the LC housing 200, the optoelectronic package 100 and the electronic assembly 300 onto the base part 400 of the optoelectronic module. Since the second jig is shaped so as to mimic the base part 400 of the two-part housing, whilst providing access to work on the above parts placed on the second jig, identical reference numerals and part names will be used to refer to corresponding parts of the second jig.

Consequently, the electronic assembly 300 is then placed (step 604) on the second jig and the leads 106 are formed, i.e. bent into shape, and cut to an appropriate length and fed through respective apertures (not shown) in the PCB 302 for receiving the leads 106. The PCB 302 is displaced, or jiggled, i.e. in a second plane substantially parallel with the planar surface 404 so as to ensure the PCB 302 now attached to the optoelectronic package 100 by the leads 106, is suitably aligned with respect to the notional central longitudinal axis of the base part 400 so as to ensure an optimum positional relationship between the edge connector 312 and the notional central longitudinal axis, thereby enabling proper connection of the edge connector 312 to another circuit board arranged to receive the edge connector 312. It should be appreciated that the aperture 307 is disposed an appropriate distance from the end 309 of the PCB 302 so as to achieve minimal lateral translation of the end 309 of the PCB 302, whilst providing a sufficient ability to laterally translate the end of the PCB 302 adjacent the optoelectronic package 100. The required location of the edge connector 312 can thus be maintained whilst enabling attachment of the leads 106 to the PCB 302 in the light of the variety of slightly different positional locations that can be assumed by the optoelectronic package 100.

Once suitable alignment tolerances are achieved, the flexible conducting leads 106 are fixed to the PCB 302 using a known soldering process.

The aligned and fixed LC housing 200, optoelectronic package 100 and electronic package 300 are then transferred from the second jig to the base part 400 of the optoelectronic module (step 606). The locator walls 430 and the nylon gasket 424 provide lateral and vertical constraints to the location of the PCB 302. The optoelectronic package 100 is adjusted in position so as to be mounted correctly within the blind channel 410. Such an adjustment in position of the optoelectronic package 100 coupled to the electronic package 300 is possible due to the freedom of movement provided by the independence of the LC housing 200 from the base part 400, i.e. the LC housing 200 is a separate part, within the complementarily shaped channel 414 that receives the LC housing 200. Once suitable alignment tolerances are met, the LC housing 200 is bonded within the complementarily shaped channel 414 using an electrically conductive epoxy such as $H_2OE$ as manufactured by Epoxy Technology, Inc. and the optoelectronic package 100 is bonded to the planar surface 404 within the blind channel 410, or to any suitable required intermediate layer disposed upon the planar surface 404 using a similar epoxy as already described above. The base part 400 with piece parts assembled thereon is then placed in an oven and the epoxy is cured (step 608) to fix the parts in place.

Finally, the top-part (not shown) of the two-part housing is brought together with the base part 400 of the two-part housing so as to close (step 610) the two-part housing. The top and base parts 400 are held together by a screw (not shown) passing through the top part and threaded into the internally threaded blind bore.

Although, in the above examples, reference has been made to LC connections, it should be appreciated that other connections are equally applicable, for example, an MU connection.

What is claimed is:

1. A module apparatus for a fibre-optic communications system, the apparatus comprising:
   a housing assembly having a base part,
   an optoelectronic package having at least one optoelectronic device therein, the optoelectronic package being disposed within the base part of the housing assembly; the optoelectronic package comprising a first part of a coupling attached thereto, the coupling being arranged to receive a ferrule connector; wherein at least a portion of the first part of the coupling is substantially fixedly located within a connector housing, and wherein the connector housing is arranged to be received within a complimentary shaped channel disposed on the base part of the housing assembly,
   wherein the base part of the housing assembly comprises a channel for locating the optoelectronic package in close thermal contact therewith.

2. An apparatus as claimed in claim 1, wherein the complimentary shaped channel is integrally formed with the base part of the housing assembly.

3. An apparatus as claimed in claim 1, further comprising an electrical circuit board electrically coupled to the optoelectronic device within the optoelectronic package.

4. An apparatus as claimed in claim 3, wherein the electrical circuit board is arranged to cooperate with a pivot arrangement so as to pivot during assembly of the apparatus about a point provided by the pivot arrangement, thereby facilitating alignment of the electrical circuit board with respect to the optoelectronic package during assembly of the apparatus.

5. An apparatus as claimed in claim 4, wherein the electrical circuit board is arranged to cooperate with the pivot arrangement near the end of the electrical circuit board distal from the optoelectronic package.

6. An upparatus as claimed in claim 5, wherein the electrical circuit board comprises an aperture formed therein located between a notional lateral centre line and the end of the electrical circuit board.

7. An apparatus as claimed in claim 3, wherein the base part of the housing assembly comprises an aperture to permit protrusion of an end of the electrical circuit board therethrough, the end of the electrical circuit board being distal from the optoelectronic package, the aperture being defined, in part, by a locator side wall for cooperating with the electrical circuit board so as to prevent exccessive protrusion of the electrical circuit board beyond the aperture.

8. An apparatus as claimed in claim 7, wherein a locator shoulder is provided at the end of the electrical circuit board to cooperate with the locator sidewall.

9. An apparatus as claimed in claim 1, wherein the connector housing is shaped and/or configured so as to define one half of an LC connection.

10. An apparatus as claimed in claim 9, wherein the half of the LC connection is an LC socket.

11. An apparatus as claimed in claim 1, wherein the base part of the housing assembly defines an internal volume and the electrical circuit board lies substantially within the internal volume, and wherein the apparatus further comprises a spacer disposed adjacent the electrical circuit board so as to locate the electrical circuit board within the internal volume.

12. An apparatus as claimed in claim 1, wherein the complimentary shaped channel is shaped so as to facilitate the close thermal contact between the optoelectronic package and the base part of the housing assembly.

13. An apparatus as claimed in claim 1, wherein the complementarily shaped channel comprises locator features to at least binder incorrect orientation of the connector housing within the complimentarily shaped channel during assembly of the apparatus.

14. An apparatus as claimed in claim 13, wherein the connector housing is arranged to comprise a complementary locator that cooperates with the locator features of the complementary shaped channel.

15. An apparatus as claimed in claim 13, wherein the complementary shaped channel is partly defined by a first wall and a second wall, the first wall being shaped so as to provide a first locator feature and the second wall being shaped so as to provide a second locator feature, the first locator feature being offset with respect to the second locator feature.

16. An apparatus as claimed in claim 15, wherein the complementary shaped channel is shaped so as to provide a clearance for receiving adhesive between the connector housing and at least a portion of one of the first or second walls.

17. An apparatus as claimed in claim 15, wherein the first locator feature is configured so as to accommodate adhesive between the connector housing and the first locator feature.

18. An apparatus as claimed in claim 17, wherein the first locator feature is configured to facilitate keying between the first locator feature and the adhesive.

19. An apparatus as claimed in claim 14, wherein the complementary locator feature is configured so as to accommodate adhesive between the connector housing and the complementary locator feature.

20. An apparatus as claimed in claim 19, wherein the complementary locator feature is configured to facilitate keying between the complementary locator feature and the adhesive.

21. An apparatus as claimed in claim 20, wherein the adhesive is electrically conductive.

* * * * *